(12) United States Patent
Jensen

(10) Patent No.: US 11,724,809 B2
(45) Date of Patent: Aug. 15, 2023

(54) AIRCRAFT PASSENGER SEAT HAVING A PLUG-IN CONNECTION

(71) Applicant: ZIM AIRCRAFT SEATING GMBH, Immenstaad am Bodensee (DE)

(72) Inventor: Alexander Jensen, Friedrichshafen (DE)

(73) Assignee: Zim Aircraft Seating GmbH, Immenstaad am Bodensee (DE)

( * ) Notice: Subject to any disclaimer, the term of this patent is extended or adjusted under 35 U.S.C. 154(b) by 0 days.

(21) Appl. No.: 17/813,710

(22) Filed: Jul. 20, 2022

(65) Prior Publication Data

US 2022/0348331 A1    Nov. 3, 2022

Related U.S. Application Data

(63) Continuation of application No. PCT/EP2021/055370, filed on Mar. 3, 2021.

(30) Foreign Application Priority Data

Mar. 5, 2020    (DE) ..................... 10 2020 106 035.1

(51) Int. Cl.
    *B64D 11/06* (2006.01)
(52) U.S. Cl.
    CPC ........ *B64D 11/064* (2014.12); *B64D 11/0636* (2014.12)
(58) Field of Classification Search
    CPC . B64D 11/06; B64D 11/0602; B64D 11/0636; B64D 11/0648; B64D 11/0606; B64D 11/064
    See application file for complete search history.

(56) References Cited

U.S. PATENT DOCUMENTS 3,037,812 A * 6/1962 Monroe ................. B64D 11/06
                                                      297/359
5,253,923 A    10/1993 Gootee
(Continued)

FOREIGN PATENT DOCUMENTS

DE    696 04 620 T2    2/2000
DE    601 11 277 T2    12/2005
(Continued)

OTHER PUBLICATIONS

International Preliminary Report on Patentability (Application No. PCT/EP2021/055370) (with Ch. II Claims) dated Feb. 2, 2022 (with English translation).

(Continued)

*Primary Examiner* — Benjamin P Lee
(74) *Attorney, Agent, or Firm* — Burr Patent Law, PLLC

(57) ABSTRACT

The invention relates to an aircraft passenger seat comprising a support framework, the support framework being designed to be fastened to a floor in an aircraft passenger cabin, wherein the support framework has a seat divider and bars running transversely to the seating direction, the seat divider being supported by the bars. A housing comprises a structural component and the housing at least partly surrounds a backrest. According to the invention, the seat divider is connected to the structural component via a connecting device, the connecting device being designed as a plug-in connection.

11 Claims, 5 Drawing Sheets

(56) References Cited

U.S. PATENT DOCUMENTS

| | | | |
|---|---|---|---|
| 5,690,386 | A | 11/1997 | Chabanne |
| 6,352,309 | B1 | 3/2002 | Beroth |
| 7,909,407 | B2 | 3/2011 | Dudash et al. |
| 9,227,729 | B2 * | 1/2016 | Udriste ............ B64D 11/06395 |
| 11,040,775 | B2 * | 6/2021 | Wong .................. B64D 11/064 |
| 2004/0004382 | A1 | 1/2004 | Dowty |
| 2011/0084168 | A1 * | 4/2011 | Marini ............... B64D 11/0647 |
| | | | 244/122 R |
| 2013/0076082 | A1 | 3/2013 | Herault |
| 2015/0284087 | A1 * | 10/2015 | Henshaw ............ B64D 11/064 |
| | | | 297/316 |
| 2017/0015420 | A1 | 1/2017 | Henshaw et al. |
| 2017/0021930 | A1 * | 1/2017 | Henshaw ............ B64D 11/064 |
| 2017/0021933 | A1 * | 1/2017 | Pozzi ................. B64D 11/0648 |
| 2017/0096226 | A1 * | 4/2017 | Mansouri ........... B64D 11/0648 |
| 2017/0283061 | A1 | 10/2017 | Papke et al. |
| 2017/0297456 | A1 * | 10/2017 | Muraiti ............. B64D 11/0648 |
| 2017/0313213 | A1 * | 11/2017 | Meister ............. B64D 11/0642 |
| 2018/0002022 | A1 * | 1/2018 | Cheng ............... B64D 11/0647 |
| 2018/0370635 | A1 * | 12/2018 | Itzinger ............. B64D 11/0648 |
| 2019/0092477 | A1 | 3/2019 | Ehlers et al. |
| 2019/0299827 | A1 * | 10/2019 | Kinard ................. B60N 2/7017 |
| 2019/0367170 | A1 | 12/2019 | Carlioz et al. |
| 2021/0179274 | A1 * | 6/2021 | Lueck ................. B64D 11/064 |
| 2021/0371112 | A1 * | 12/2021 | Wisniewski ....... B64D 11/0636 |

FOREIGN PATENT DOCUMENTS

| | | | |
|---|---|---|---|
| DE | 10 2008 020 156 A1 | 12/2008 | |
| DE | 102020106037 A1 * | 9/2021 | .......... B64D 11/062 |
| EP | 3 459 852 A1 | 3/2019 | |
| WO | 2005/095210 A1 | 10/2005 | |
| WO | 2006/059118 A1 | 6/2006 | |

OTHER PUBLICATIONS

German Search Report (Application No. 10 2020 106 035.1) dated Feb. 28, 2021.

International Search Report and Written Opinion (Application No. PCT/EP2021/055370) dated Jun. 25, 2021 (with English translation).

* cited by examiner

AIRCRAFT PASSENGER SEAT HAVING A PLUG-IN CONNECTION

CROSS REFERENCE TO RELATED APPLICATIONS

This application is a continuation of International Application No. PCT/EP2021/055370 filed Mar. 3, 2021, which designated the United States, and claims the benefit under 35 USC § 119(a)-(d) of German Application No. 10 2020 106 035.1 filed Mar. 5, 2020, the entireties of which are incorporated herein by reference.

FIELD OF THE INVENTION

The present invention relates to an aircraft passenger seat having a connecting device, and to a row of seats formed from a plurality of such aircraft passenger seats.

BACKGROUND OF THE INVENTION

Aircraft passenger seats or rows of seats consisting of a plurality of aircraft passenger seats arranged next to one another are known for equipping passenger aircraft. The aircraft passenger seats can have a multiplicity of embodiments.

All aircraft passenger seats have to comply with safety guidelines. At the same time, the seats are intended to weigh as little as possible. In addition, a compact external shape is desired.

The aircraft passenger seat is intended to be constructed in such a manner that it passes tests, in particular, crash tests, prescribed in the safety guidelines. For this purpose, stable connections are necessary between various components of the aircraft passenger seat.

For example, there is a seat belt on the aircraft passenger seat. The seat belt is preferably designed as a lap belt and connected, for example, to a frame and/or to a seat divider of the aircraft passenger seat at, for example, two belt attachment points.

SUMMARY OF THE INVENTION

It is the object of the present invention to provide an improved aircraft passenger seat with increased stability.

In the following, all directions are indicated with respect to a sitting direction, wherein the sitting direction should be understood as meaning the direction in which an aircraft passenger looks when sitting on the aircraft passenger seat.

The present invention is based on an aircraft passenger seat having a frame which is provided for fastening to a floor of an aircraft passenger cabin, wherein the frame comprises a seat divider and cross rails running transversely with respect to the sitting direction, wherein the seat divider is held by the cross rails, wherein a housing is provided with a structural component, wherein the housing at least partially surrounds a backrest.

The aircraft passenger seat preferably comprises a head restraint, a backrest, a seat base, and a leg support. These, for example, four essential parts of the aircraft passenger seat are connected to one another, preferably via fittings and/or joints, and are advantageously able to be set, in particular adjusted, relative to one another.

The floor of the aircraft passenger cabin is denoted by the term "bottom", while an opposing position which is, in particular, spaced apart vertically relative to the bottom is denoted by the term "top".

Preferably, the structural component, the seat divider and the cross rails are produced from a metal material, advantageously from aluminum, or from a different lightweight and stable material, and/or, for example, from a composite material, in particular, from a carbon-fiber composite material. Advantageously, all of the components of the aircraft passenger seat are optimized in respect of their materials and the associated weight. In particular, the shape of the components is also optimized in respect of the weight, and, therefore, the components have, for example, material recesses which are selected in a targeted manner and which contribute to a saving on weight of the respective component.

The aircraft passenger seat can be arranged with the frame on the floor of an aircraft passenger cabin. The frame comprises the seat divider and cross rails running transversely with respect to the sitting direction, there being a first front cross rail and a second cross rail arranged therebehind, as viewed in the sitting direction. Preferably the two cross rails are arranged on the seat divider. Advantageously, the two cross rails run spaced apart, in particular, generally parallel, to one another.

The seat divider is designed as a mechanically stable component of the aircraft passenger seat. In particular, the seat divider is configured to absorb forces which act in the event of a crash on the aircraft passenger seat and/or to conduct the forces in the direction of the floor of the aircraft cabin.

The seat divider has a height, a width, and a depth, as viewed in the sitting direction. The width of the seat divider is preferably smaller than the depth of the seat divider. For example, the height of the seat divider results from a dimension in the vertical direction relative to the aircraft passenger seat. The height of the seat divider is preferably a multiple of the width and/or of the depth of the seat divider.

The housing can be arranged, for example, can be fixedly connected, to the seat divider. The housing comprises the structural component. The housing at least partially surrounds the backrest of the aircraft passenger seat.

In a preferred embodiment, the aircraft passenger seat comprises the housing which can be arranged in the region of the backrest. For example, the backrest in the region of the housing is guided adjustably, in particular, movably, relative to the housing. The housing is preferably provided in a stationary manner in the aircraft passenger cabin, for example, in a fixed position and, in particular, so as not to be movable during the adjustment of the backrest. In an advantageous embodiment variant, the housing can be arranged on the seat divider. The housing preferably conceals the structural component which is arranged, for example, inside the housing. The housing is shell-shaped and/or U-shaped, for example.

There are preferably two seat dividers per aircraft passenger seat. For example, the two seat dividers are arranged spaced apart from each other. The two seat dividers are preferably arranged parallel to each other. In an advantageous manner, two planes, spanned in each case by the height and the depth of the seat divider, are arranged at least approximately parallel to each other. In particular, the aircraft passenger seat is delimited on both sides, in particular, on the outside, by the seat dividers, advantageously in the region of the seat base. The seat divider is preferably designed to be mechanically load-bearing such that, for example, the belt attachment points for the seat belt for the aircraft passenger can be arranged on, for example, can be screwed to, the seat divider.

In an advantageous embodiment, the structural component is arranged on the seat divider. For example, the structural component is arranged above and adjoining the seat divider. In particular, the structural component has a width, a height, and a depth. The structural component is preferably strip-shaped, for example, the height is a multiple of the depth and/or of the width of the structural component.

The essence of the present invention is that the seat divider is connected to the structural component via a connecting device being designed as a plug-in connection.

The connecting device is preferably designed as the plug-in connection. A very stable connection between the seat divider and the structural component is advantageously achieved by the connecting device. In particular, the connecting device is provided to absorb forces that may arise in the event of a crash and/or to transmit the forces via the seat divider to the supporting leg and/or to the cabin floor. Furthermore, the connecting device permits a simple and/or rapid assembly from a plurality of parts during the installation of the aircraft seat. The seat divider and the structural components are advantageously separately preassembleable components of the aircraft passenger seat.

In an advantageous embodiment, the connecting device, in particular, the plug-in connection, is arranged on each seat divider of the aircraft passenger seat.

In an advantageous refinement, the structural compartment is at least partially concealed by the housing. In one advantageous embodiment, the housing is produced from plastic. Virtually any desired shape of the housing can thus be realized. The housing gives rise, for example, to more pleasant sitting on an aircraft passenger seat arranged therebehind. An aircraft passenger sitting there is advantageously not substantially affected or disturbed by adjustment of the backrest of the front aircraft passenger seat, as seen in the sitting direction, since the housing is advantageously designed to be fixed in position.

In an advantageous embodiment, the connecting device comprises a first plug-in element and comprises a second plug-in element, the first plug-in element being arranged on the seat divider and the second plug-in element being arranged on the structural component.

The plug-in connection advantageously comprises the first and the second plug-in element. For example, the first plug-in element is arranged, in particular, formed, integrally on and/or from the upper end of the seat divider. In particular, the first plug-in element is formed and/or shaped, for example, milled, out of the material of the seat divider. Alternatively, the first plug-in element is attachable, in particular, screwable and/or rivetable to the upper end of the seat divider.

The second plug-in element is advantageously arranged on the structural component. In particular, the second plug-in element is fixed to the structural component, in particular, non releasably, for example, by means of rivets. In a further embodiment variant, the second plug-in element is, for example, formed and/or shaped from the structural component and/or arranged integrally on the structural component.

The connecting device is preferably designed as a type of tongue-and-groove connection.

In particular, the plug-in connection is designed as a type of tongue-and-groove connection. For example, the first plug-in element is designed as a spring of the tongue-and-groove connection. Preferably, the first plug-in element, designed as the tongue, is a separating element which advantageously has a beveled plug-on surface, for example, designed in the form of a bevel. The second plug-in element is advantageously designed as a type of groove in the tongue-and-groove connection. For example, the second plug-in element comprises an opening, in particular, a slot-like recess, advantageously a groove. The groove is preferably formed and/or delimited by opposite walls or cheeks.

Furthermore preferably, the first plug-in element can be arranged in the second plug-in element, in particular, if the tongue-and-groove connection is involved. Preferably, the first plug-in element is pluggable, in particular, completely pluggable, and/or countersinkable, in particular, completely countersinkable, in the second plug-in element.

In a preferred embodiment variant, the first plug-in element is arranged on the seat divider, the first plug-in element comprising a recess, and the recess having a depth of at least 50% of the depth of the seat divider, as seen in the sitting direction.

The first plug-in element advantageously comprises the recess. The first plug-in element is preferably arranged with the recess in the upper region of the seat divider, in particular, at the upper end. A respective recess is preferably arranged on both sides of the first plug-in element. In particular, the two recesses are arranged lying opposite each other. Advantageously, the separating element is arranged between the recesses, and, in particular, the recesses border the separating element on both sides. The recess is, for example, 50%, 60%, 70%, 80%, 85%, 90%, 95%, 99%, 100% the depth of the seat divider, as seen in the sitting direction. In particular, further desired values between 50% and 100% are also possible. In an advantageously manner, a height of the recess is approximately the same size as the depth of the recess. For example, the recess has a width which corresponds, in particular, to 10% to 40%, preferably 25% of the width of the seat divider. Preferably, two recesses together result in a width of between 20% and 80%, preferably 50% of the width of the seat divider, and, in particular, further desired values between 20% and 80% are also possible. The recesses are advantageously designed to be similar, in particular, identical, on both sides of the seat divider. Owing to the advantageous configuration with opposite recesses, a region arises between the two recesses, the separating element, which likewise corresponds to approx. 50% of the width of the seat divider. For example, the width of the separating element amounts to values between 20% and 80% of the width of the seat divider. The width of two recesses and the width of the separating element advantageously corresponds to the width of the seat divider.

The separating element advantageously comprises a leadthrough, for example, a hole. By means of the leadthrough, designed, for example, as a screw hole, the plug-in connection is fixable in the arranged state of the two plug-in elements. There are preferably a plurality of, in particular, four, leadthroughs in the two plug-in elements for fixing purposes. In an advantageous manner, a further opening, in particular, in the form of a larger hole, is arranged on the separating element. The larger hole is provided, for example, for saving on material and therefore reducing the weight of the component.

In a preferred embodiment, the second plug-in element comprises a tongue. The tongue is advantageously formed, in particular, integrally, on the second plug-in element. In a preferred embodiment variant, the second plug-in element comprises a plurality of sections, in particular, two sections. For example, there is an upper section and a lower section. The upper section is designed, for example, as an attachment surface to the structural component. In particular, the lower section of the second plug-in element is designed as the tongue. For example, the tongue can be arranged on the recess of the first plug-in element on the seat divider. The tongue is preferably designed as a counterpart to the first plug-in element. In particular, the two plug-in elements are designed in such a manner that they interact in a form-fitting manner. The two plug-in elements in the arranged state preferably form a plugged-in state. The tongue has a height which advantageously corresponds to the height of the recess of the first plug-in element on the seat divider. The surfaces of the two plug-in elements that touch in the plugged-in state, for example, the recess of the first plug-in element and a side surface of the tongue, are contact surfaces of the first and/or second plug-in element.

In an advantageous embodiment, the first plug-in element comprises precisely one recess and the second plug-in element precisely one tongue. Preferably, the precisely one recess and the precisely one tongue form the connecting device, in particular, the plug-in connection.

The second plug-in element preferably comprises two tongues, the tongues being arranged spaced apart from each other on the structural component. In particular, the distance between the two tongues is determined by the width of the structural component at an attachment point. The type of groove in the tongue-and-groove connection is preferably formed by the clearance between two tongues.

In an advantageous embodiment, the tongue has a height which is 50% to 150% of the depth of the recess on the first plug-in element. For example, the height of the tongue is 30% to 200% of the depth of the recess, preferably 75% to 125%, in particular, 100% of the depth of the recess.

The two tongues together advantageously have a width of approximately 50% of the width of the seat divider. In particular, each tongue per se has a width of between 10% and 40% of the width of the seat divider, in particular, 25% of the width of the seat divider.

The second plug-in element preferably has a height between 150% and 500% of the height of the tongue, for example, 200% to 400%, preferably 300%.

In an advantageous manner, the first plug-in element comprises a guide surface. For example, the guide surface is designed as a region protruding in comparison to the surface of the recess. In particular, the guide surface is a delimitation of the surface of the recess. In an advantageous manner, the guide surface protrudes at an angle from the surface of the recess. In the plugged-in state, the surface of the recess is the contact surface of the first plug-in element.

In a preferred embodiment, the first plug-in element comprises a plurality of guide surfaces, in particular, two, which are formed lying opposite one another. For example, the two opposite guide surfaces are formed approximately vertically with respect to the orientation of the aircraft passenger seat. The two guide surfaces are advantageously designed as a front guide surface and a rear guide surface, with the direction being selected with respect to the sitting direction. The rear guide surface, as seen in the sitting direction, is preferably designed in such a manner that the rear guide surface extends from the lower end of the first plug-in element as far as the upper end of the first plug-in element. Advantageously, the second plug-in element slides along the rear guide surface when the connecting device is joined together.

Furthermore preferably, the front guide surface, as seen in the sitting direction, is formed obliquely, in particular, at an angle, to the connecting surface. This advantageously results in the second plug-in element being guided, in particular, sliding along, the guide surface when the plug-in connection is joined together. For example, at the upper end of the front guide surface there is a run-on slope in the form of a curvature with a radius, the run-on slope facilitating the joining together of the plug-in connection.

In an advantageous embodiment variant, the two plug-in elements in the arranged state have approximately the same width as the seat dividers. The two plug-in elements in the jointed together state preferably have a width which is approximately equal to the width of the seat divider. The two plug-in elements in the plugged-in state advantageously have a width equal to the width of the seat divider.

In an advantageous embodiment, the first plug-in element in the region of the recess has a width of 10% to 80%, in particular, 50% of the width of the seat divider. The first plug-in element preferably has two opposite recesses. These two recesses correspond, for example, together approximately to half of the width of the seat divider. In particular, each recess corresponds to between 10% and 40% of the width of the seat divider, preferably 25%. The width of the separating element is preferably produced form the width of the first plug-in element, in particular, the width of the seat divider below the recess, minus the width of the two recesses.

The first plug-in element preferably comprises an upper and a lower end, the upper end comprising at least one beveled plug-on surface and the lower end being a surface protruding with respect to the surface of the recess. The upper end is advantageously designed as a plug-on slope. The upper end is preferably formed on both sides as a respective beveled plug-on surface, for example, a bevel. In particular, the two plug-on surfaces are arranged at an angle to each other, for example, are roof-shaped. For example, the beveled plug-on surfaces at the upper most end of the first plug-in element are closer together than in the direction of the lower end of the recess.

In an advantageous embodiment, the first plug-in element comprises a connecting surface at its lower end of the recess. The connecting surface is preferably designed as a surface protruding with respect to the recess. The connecting surface is preferably oriented horizontally, in particular, can be oriented approximately parallel to the floor of the aircraft passenger cabin. The two opposite guide surfaces are advantageously connected to each other by the connecting surface. One of the guide surfaces and the adjacent connecting surface are preferably connected by a curvature, advantageously in the form of a circular section, in particular, with a radius. In particular, the two guide surfaces are connected to each other by the connecting surface with two different radii. Two identical radii are also possible. Particularly preferably, there is a radius, which is larger than the other radius, in the front curvature and a correspondingly smaller radius at the rear curvature, as seen in the sitting direction.

In a preferred embodiment with different radii and a vertical guide surface with an, in particular, small deviation from the vertical orientation, a mistake-proof configuration of the connecting device, in particular, an error-proof configuration of the plug-in connection, is produced. In an advantageous manner, the plug-in connection can be fixed only in a correct position of the plug-in elements in one another. In an advantageous manner, the second plug-in element is positioned by the plug-on slopes at the upper end of the first plug-in element during the joining together in the direction of the width of the plug-in connection or in the direction of the width of the seat divider. Furthermore, the two guide surfaces result in a further positioning of the second plug-in element relative to the first plug-in element during the joining together in the direction of the depth of the plug-in elements or in the direction of the depth of the seat divider.

The structural component preferably has a horizontal surface. In particular, the horizontal surface is a lower end of the structural component. The horizontal surface is produced, for example, from the width and the depth of the structural component. The horizontal surface of the structural component is preferably formed approximately parallel to the upper end of the first plug-in element.

In a further advantageous refinement, the structural component has a protruding lug at the lower end, in particular, in the region of the horizontal surface. The protruding lug is formed from the structural component and/or can be produced integrally from the structural component. It is also possible to fix the lug to the structural component by means of, for example, screws and/or rivets. For example, the protruding lug is arranged on the structural component in front of the connecting device in the sitting direction.

In a preferred embodiment variant, the second plug-in element has an attachment surface by which the second plug-in element is arranged on the structural component. Preferably, in the region of the attachment surface, there are leadthroughs for rivets and/or screws for arranging on, in particular, for fastening to, the structural component. For example, the attachment surface is designed for fixing to the structural component. The attachment surface is advantageously the upper section of the second plug-in element, preferably arranged spaced apart from the tongue on the second plug-in element. In an advantageous embodiment, the tongue is adjacent to the attachment surface.

The second plug-in element preferably has two parts which are each formed, for example, from a tongue and an attachment surface.

A row of seats preferably comprises at least two aircraft passenger seats according to one of the preceding configuration options. For example, two of the above-described aircraft seats are arranged in a row of seats, in particular, as a pair of aircraft passenger seats. The pair of aircraft passenger seats is advantageously arranged in such a manner that two supporting legs which are connectable to the cabin floor, in particular, to holders in the cabin floor, are sufficient. For example, the supporting legs are connected to each other by the cross rail, and there are preferably two cross rails. In an advantageous variant, the supporting legs are fixed to the cross rail by means of a disk hub connection. Also advantageously, the seat dividers can be arranged on the cross rails thus enabling the row of seats to be formed. The pair of aircraft passenger seats preferably comprises four seat dividers with four connecting devices, for attaching four structural components.

BRIEF DESCRIPTION OF THE DRAWINGS

Further advantageous features, refinements, variants and embodiments are described in more detail with reference to a schematic exemplary embodiment.

DETAILED DESCRIPTION OF THE INVENTION

Figure 3:
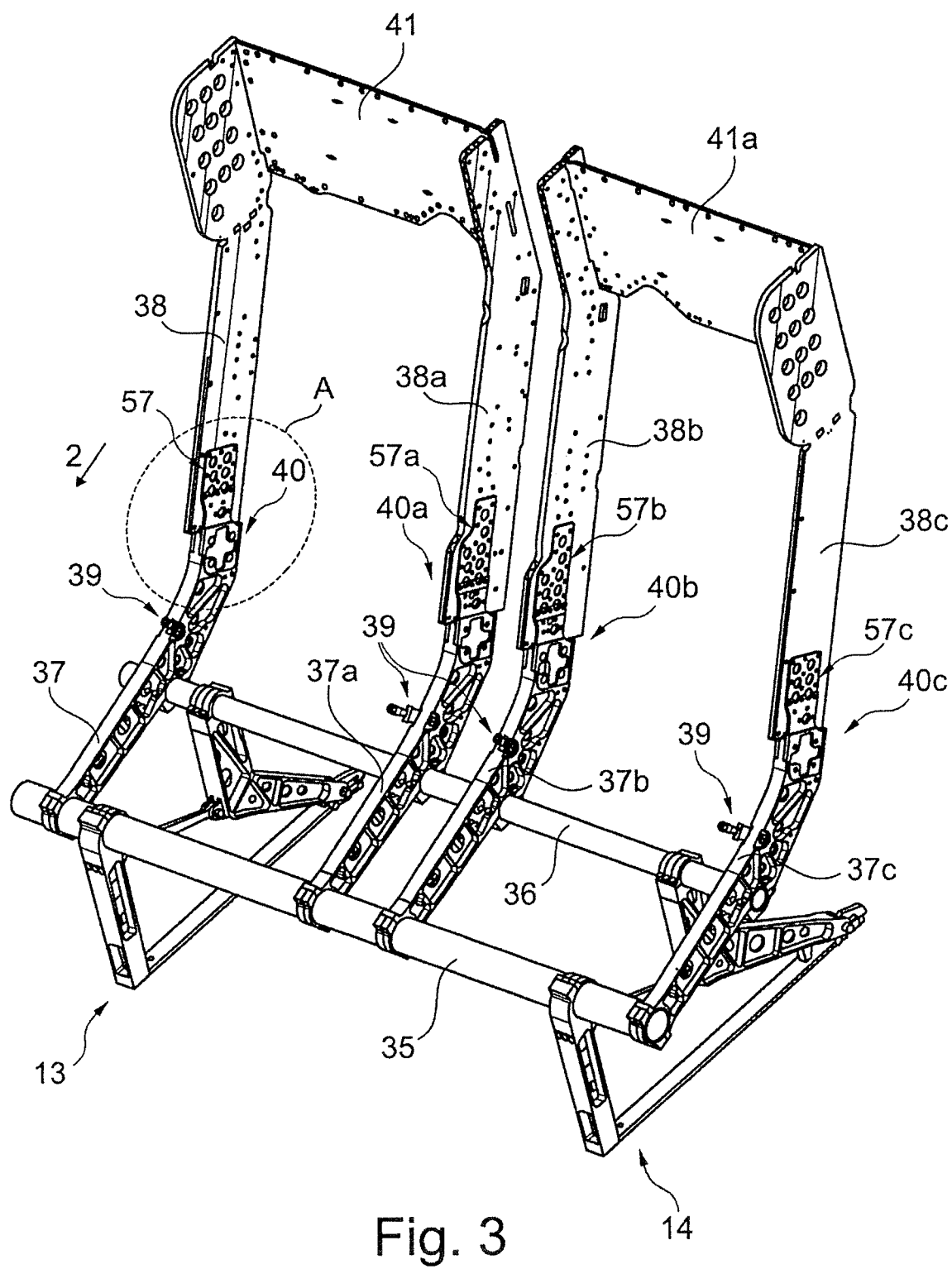
FIG. 3 shows part of a frame and a plurality of structural components of the row of seats from FIG. 1 in a perspective view obliquely from the front.
Figure 4:
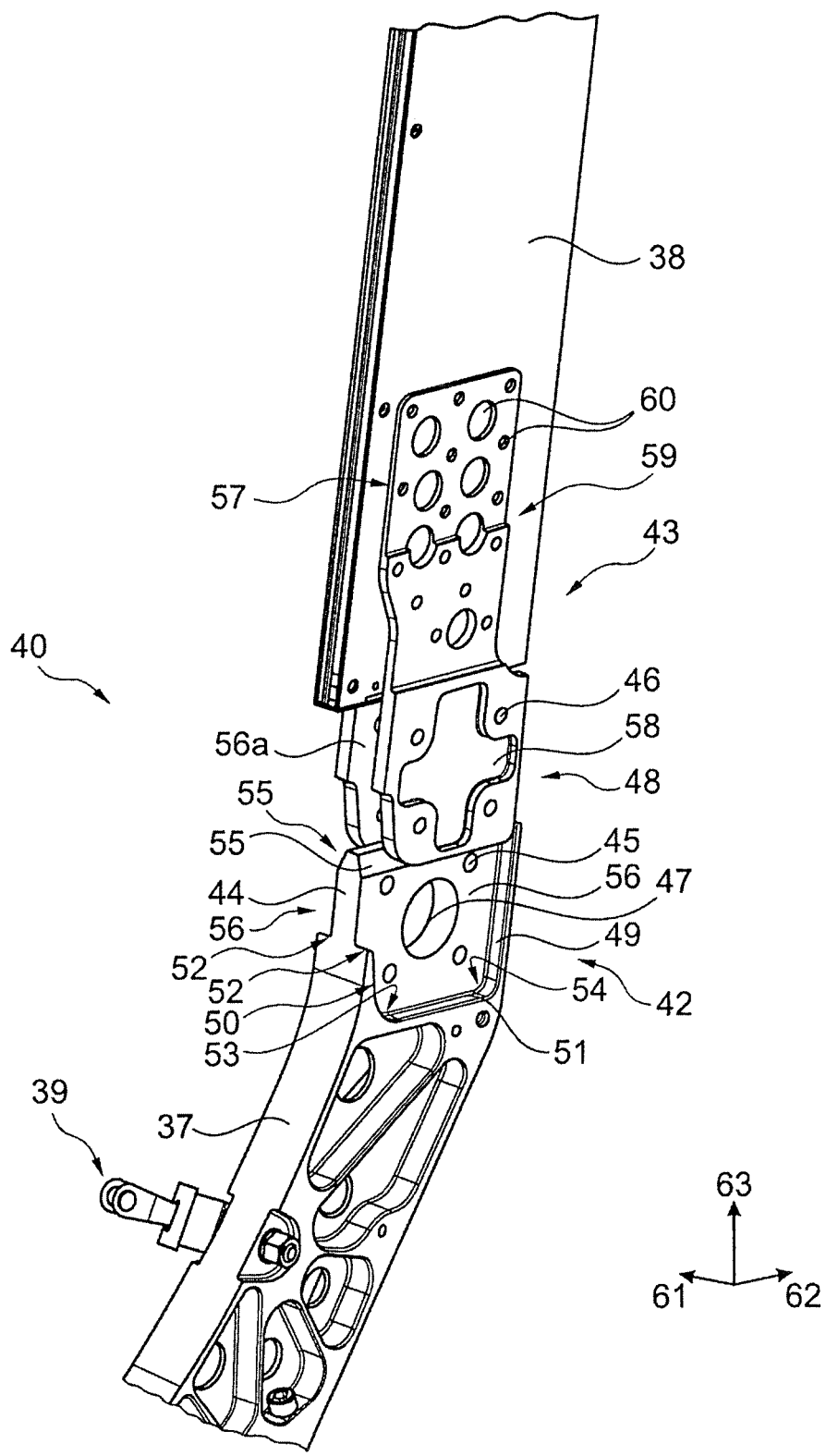
FIG. 4 shows the connecting device according to the invention in a detailed view A from FIG. 3 in an obliquely lateral view.
Figure 5:
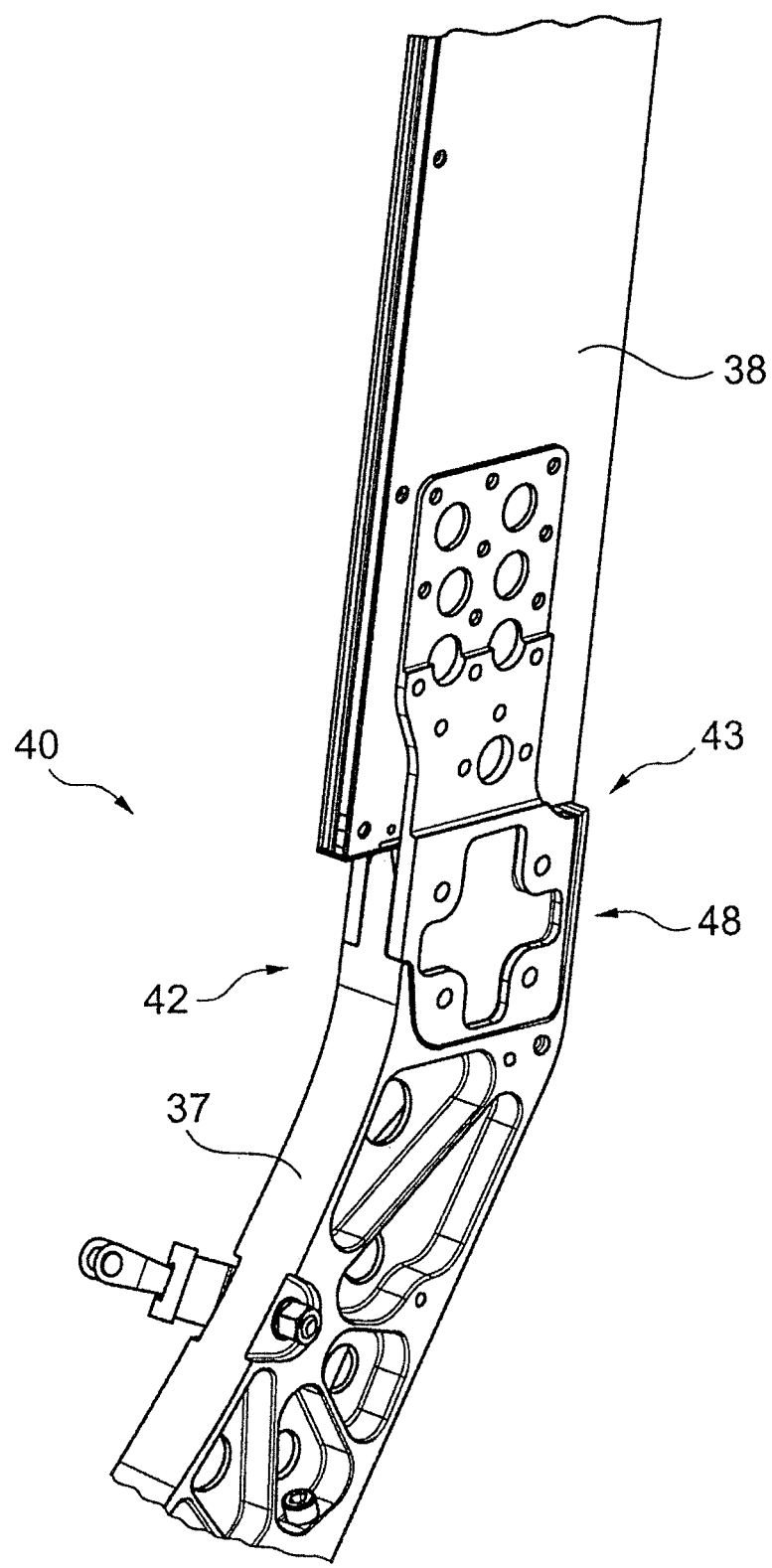
FIG. 5 shows the connecting device from FIG. 4 in a joined-together state in an obliquely lateral view.

Further components which are not illustrated in FIGS. 3 to 5 are required for a usable functional aircraft passenger seat. Only the components required for the connecting device will be described in detail.

Figure 1:
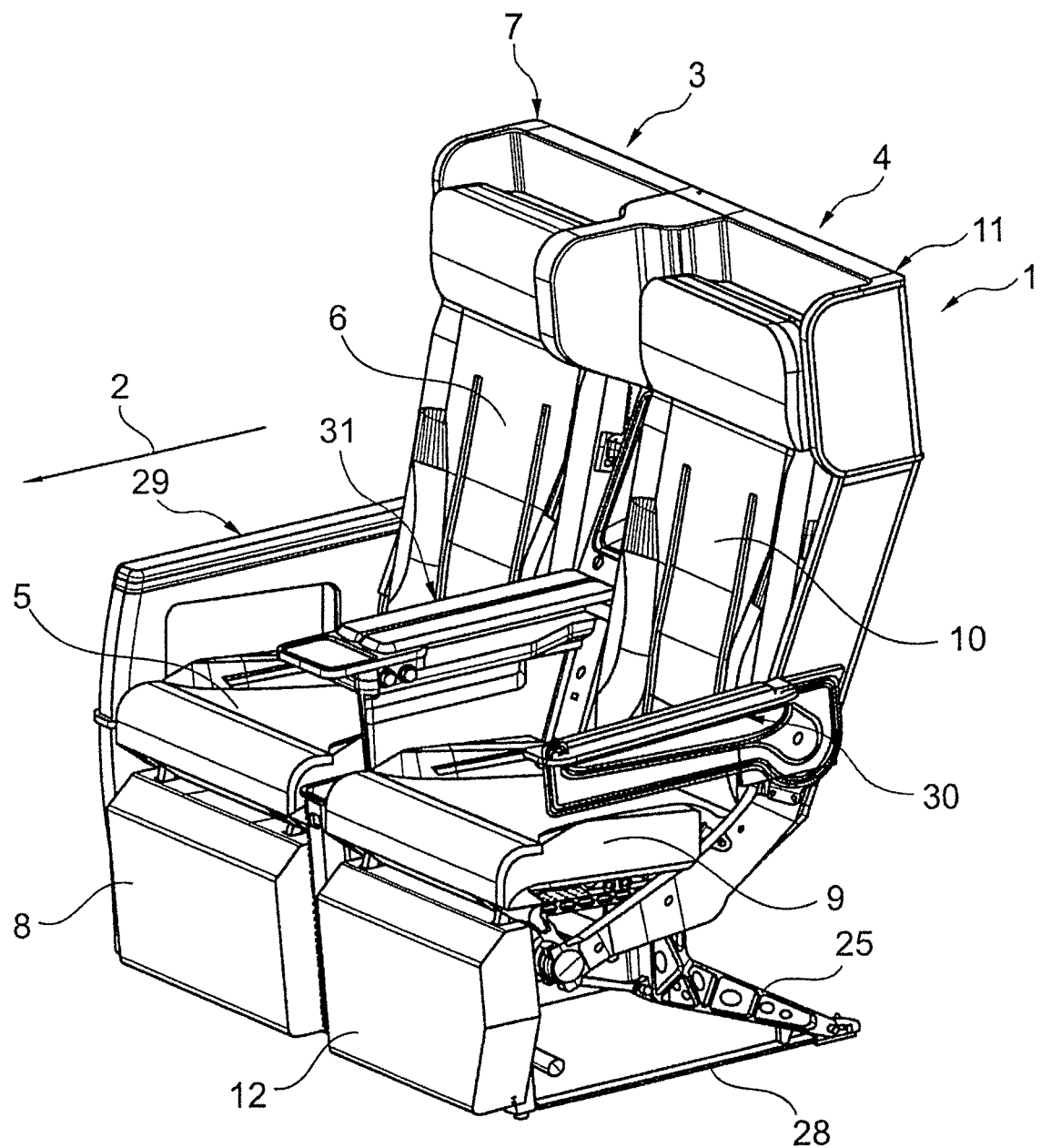
FIG. 1 shows a perspective view obliquely from the front of a row of seats with two aircraft passenger seats, in each case comprising a seat base, a backrest together with a rear housing, and a leg support.

FIG. 1 shows a row of seats 1 with a sitting direction 2 with two aircraft passenger seats 3 and 4. Positional and directional information such as front, rear, top and bottom refer below to the sitting direction 2 and to the use state of the row of seats 1.

The two aircraft passenger seats 3 and 4 are correspondingly constructed. The aircraft passenger seat 3 has a seat base 5, a backrest 6, and a housing 7 to the rear of the backrest 6. Adjoining a front end region of the seat base 5 is a preferably foldable leg support 8 which is foldable about a horizontal axis.

Accordingly, the aircraft passenger seat 4 comprises a seat base 9, a backrest 10, a housing 11, and a leg support 12.

The seat bases 5, 9, the backrests 6, 10, and the leg supports 8, 12 comprise a preferably ergonomically shaped upholstery.

The aircraft passenger seats 3 and 4 can be mounted on a cabin floor of a cabin of an associated aircraft via two supporting legs 13 and 14.

For this purpose, the supporting leg 13 has a mounting point 17 on a lower end region 16 of a front strut 15, and a further mounting point 20 on a lower end region 19 of a rear strut 18. A bracing element 21 is provided between the end regions 16 and 19.

The supporting leg 14 has a mounting point 24 on a lower end region 23 of a front strut 22 and a further mounting point 27 on a lower end region 26 of a rear strut 25. A bracing element 28 is provided between the end regions 23 and 26.

The row of seats 1 additionally has an outer arm rest 29 to the side on the aircraft passenger seat 3 and an outer arm rest 30 to the side on the aircraft passenger seat 4. Between the two aircraft passenger seats 3 and 4 there is a console 31, preferably level with the two outer arm rests 29 and 30, the console likewise being able to be used by an aircraft passenger as an arm support.

The respectively associated backrest 6 or 10 is arranged in a shell shape of the respective housing 7 or 11. The backrest 6 or 10 is preferably movably guided in the housing 7 or 11 for setting different tilted positions, for example, together with the associated displaceably mounted seat base 5 or 9.

The housings 7 and 11 are provided with further elements, for example, on the rear side in each case provided with additional functions. For example, a multimedia unit 32 for digital media is provided in each case in an upper rear region of the housings 7, 11, for example, having an electronic input and output device or having a touchscreen.

Figure 2:
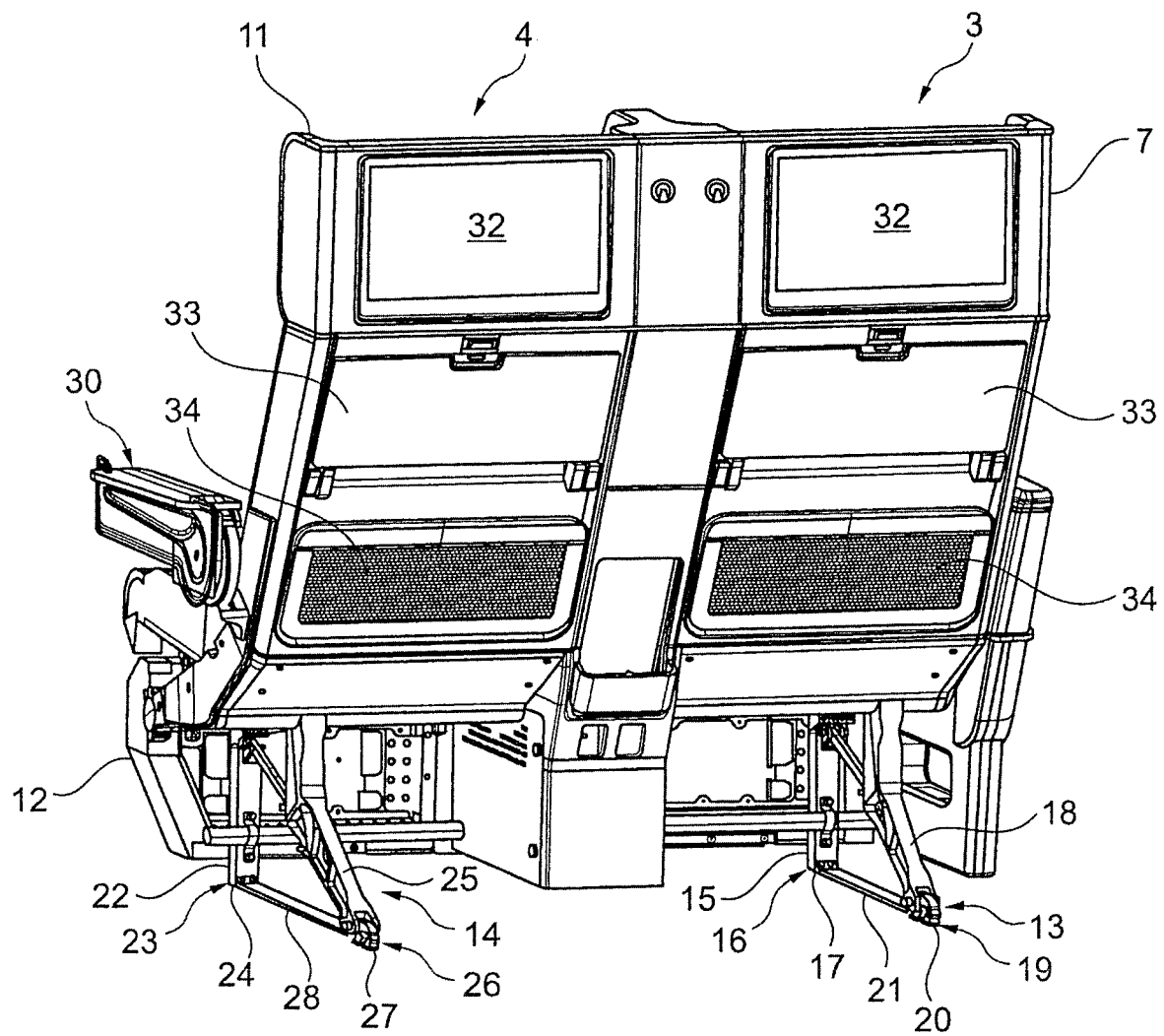
FIG. 2 shows the row of seats according to FIG. 1 in a perspective view obliquely from the rear.

For example, a foldable tray element 33, such as a tray table with a table top, is formed in each case in a region adjoining below the multimedia unit 32 or central region. In FIG. 2, the tray elements 33 are shown in a folded-up, vertical and secured non-use position.

A storage compartment 34, for example, for accommodating magazines or brochures or other objects, is present below the respectively foldable tray element 33.

FIG. 3 shows a perspective view of a basic structure of the row of seats 1 of the aircraft passenger seats 3, 4. The basic structure comprises, in particular, a frame and a plurality of structural components 38, 38a, 38b, 38c, 41 and 41a.

For example, two cross rails 35, 36 are arranged on the frame which comprises the supporting legs 13, 14. The front cross rail 35 and the rear cross rail 36 are advantageously oriented approximately parallel to one another. A seat divider 37 is preferably arranged on the cross rails 35 and 36. Preferably, there are two seat dividers 37, 37a for the aircraft passenger seat 3 and the further seat dividers 37b, 37c for the aircraft passenger seat 4. In particular, the seat dividers 37 to 37c have different material recesses. The seat dividers 37, 37a, 37b, 37c are preferably constructed to be the same, in particular, identical. The seat divider 37 is designed, in particular, as a flat, angled, for example, arcuate, component. For example, a connecting device 40 according to the present invention is arranged at the upper end of the seat divider 37.

In an advantageous manner, a structural component 38 is attached to the seat divider 37 via the connecting device 40. The structural component 38a is attached to the seat divider 37a likewise via the connecting device 40a. Furthermore, the structural component 38b is attached to the seat divider 37b by means of the connecting device 40b, and the structural component 38c is likewise attached to the seat divider 37c by means of the connecting device 40c.

In the embodiment illustrated, a connecting structural component 41 is arranged, for example, on two structural components 38, 38a. The connecting structural component 41 is preferably attached at an upper end of the vertically oriented structural components 38, 38a. A connecting structural component 41a is arranged between the vertically oriented structural components 38b and 38c. The connecting structural component 41 or 41a preferably interacts in a stiffening and/or mechanically stabilizing manner with the two vertical structural components 38 and 38a or 38b and 38c. For example, the connecting structural component 41 and the structural components 38, 38a are connected to each other by means of connecting mechanisms (not illustrated), for example, brackets and/or screws and/or rivets. Alternatively, an integral design of the structural components with the connecting structural component is possible. The same applies to the connecting structural component 41a.

The connecting structural component 41 or 41a is preferably deigned as a plate-like element with a long side and a short side and a thickness. For example, the connecting structural component is oriented in such a manner that the long side of the connecting structural component 41 or 41a is arranged in the horizontal direction with respect to the aircraft passenger seat.

The three spatial directions of width 61, depth 62 and height 63 are illustrated in FIG. 4 and refer to the orientation of the seat divider 37 or 37a, or 37b, or 37c.

For example, according to the illustration in FIG. 3 the connecting device 40 or 40c is arranged in each case on the right or on the left on the outside of the seat divider 37 or 37c and on the structural component 38 or 38c. The connecting device 40a or 40b is preferably arranged in each case on the centrally arranged seat dividers 37a or 37b. In particular, the connecting devices 40 and 40c differ from the connecting devices 40a and 40b by the shape of the attachment surfaces 57 and 57c to 57a and 57b.

The respectively outer structural components 38 and 38c preferably likewise differ in terms of their shape from the respectively inner structural components 38a and 38b. For example, there is a widened portion on the structural component 38 at the upper end while the structural component 38a has a widened portion at the lower end in the region of the attachment surface 57a.

In an advantageous embodiment, a belt attachment 39 is arranged on each seat divider 37, 37a, 37b, 37c, in particular, all four belt attachments 39 arranged thereon are designed in a similar manner. For example, the belt attachment 39 is screwed onto the seat dividers 37 to 37c, advantageously a seat belt with, in particular, a belt buckle and/or a hook coordinated with the belt buckle and/or an eye can be attached to the belt attachment 39.

FIG. 4 illustrates the detail A from FIG. 3 in enlarged form. The statements below apply to the connecting deice 40, but likewise also to the connecting devices 40a to 40c.

The connecting device 40 is shown in FIG. 4 in a state in which the seat divider 37 and structural component 38 are not joined together. The connecting device 40 preferably comprises a first plug-in element 42 and a second plug-in element 43.

The first plug-in element 42 is preferably arranged at the upper end of the seat divider 37 that is oriented toward the structural component 38. For example, the first plug-in element 42 is shaped integrally on the seat divider 37, in particular, for example, milled from the material of the seat divider or produced by milling machining. The first plug-in element 42 advantageously has two opposite recesses which are located on both sides of the separating element 44. For example, the recesses are a planar removal of material to a depth Tl, and, in particular, the two recesses are identical, and therefore the separating element 44 remains between the recesses. In particular, the recesses each have a vertically oriented contact surface 56. For example, the contact surface 56 is also a boundary surface of the separating element 44; preferably, the contact surfaces 56 are formed identically on both sides of the separating element 44. The contact surface 56 advantageously has a depth and a height. The two directions are indicated with respect to the orientation of the seat divider or of the aircraft passenger seat.

The separating element 44 has a plug-on slope 55 at the upper end, for example. The plug-on slope 55 is preferably formed on an upper end region of the contact surface 56. For example, the plug-on slope 55 is formed identical on both sides of the separating element 44 such that the plug-on slopes 55 on the separating element 44 are oriented in a roof-shaped manner.

For example, there are a plurality of leadthroughs 45, for example, designed as screw holes, on the separating element 44. Preferably, four leadthroughs 45 are arranged on the contact surface 56, in particular, symmetrically, for example, in accordance with the corners of a rectangle and/or square. A hole 47 which is larger than the leadthroughs 45 and which is provided, for example, for saving on weight is advantageously preferably arranged in the center of the contact surface 56.

Each of the contact surfaces 56 is delimited on, for example, three sides, by surfaces protruding at an angle to the plane of the contact surface 56, for example, by two vertically oriented guide surfaces 49 and 50 and a horizontally oriented connecting surface 51.

The guide surfaces 49 and 50 are advantageously elongate and/or strip-shaped; in particular, they are oriented vertically in the longitudinal direction. For example, the connecting surface 51 is elongate and/or strip-shaped; in particular, the connecting surface 51 is oriented horizontally in the longitudinal direction with respect to the aircraft passenger seat 3, 4.

The guide surfaces 49 and 50 and the connecting surface 51 preferably protrude approximately at right angles form the contact surface 56. The guide surface 49 is advantageously connected to the connecting surface 51 via a concave curvature 54 with, for example, a radius. The connecting surface 51 is preferably connected to the guide surface 50 likewise by a further concave curvature 53 with an, in particular, further radius.

In a preferred embodiment variant, the guide surface 50 is formed at the front of the contact surface 56, as seen in the sitting direction. The guide surface 50 is preferably formed approximately vertically or of only a slight deviation from the vertical direction of the aircraft passenger seat. The guide surfaces 49 and 50 preferably differ in their deviations in the vertical direction. In an advantageous manner, the rear guide surface 49 is higher than the front guide surface 50. For example, the rear guide surface 49 extends over virtually the entire height of the contact surface 56, while the front guide surface 50 extends only over a part, in particular, approximately half, of the height of the contact surface 56.

For example, a run-on slope 52 is arranged at the upper end of the guide surface 50. The run-on slope 52 is preferably designed as a convex curvature, with, in particular, a radius. Preferably, by means of the run-on slope 52 and the plug-on slopes 55 in conjunction with the rear guide edge 51, placing of the structural component 38 onto the seat divider 37 is simplified. In the embodiment variant which is illustrated, the radius between front guide surface 50 and connecting surface 51 is greater than the radius between rear guide surface 49 and connecting surface 51. Similarly, it is possible the other way around, or else that the two radii are identical.

In an advantageous embodiment, at least one tongue 48 is arranged at the lower end of the second plug-in element 43, on the outer side of the structural component 38. The second plug-in element 43 is preferably constructed from two identical parts which each have the tongue 48 and an attachment surface 57. The tongues 48 are attached, preferably spaced apart, to the structural component 38. Furthermore preferably, the tongues 48 are identical.

The outer shape of the tongue 48 is preferably coordinated, in particular, by a border surface, with the guide surfaces 49 and 50 and the connecting surface 51 in such a manner that the border surfaces of the tongue 48 lie on the surfaces 49, 50, 51, and/or the surfaces 49, 50, 51 and the border surfaces of the tongue 48 interact in a form-fitting manner. For example, an outwardly open material recess 58 is arranged on one side of the tongue 48. The material recess 58 advantageously serves for reducing weight.

Preferably, a contact surface 56a is arranged on the tongue 48 opposite the material recess; in particular, that side of the tongue which comes into contact with the contact surface 56 on the first plug-in element 42 is designed as the contact surface 56a. The contact surface 56 is preferably in planar contact with the contact surface 56a, or the two contact surfaces 56 and 56a are at least partially in mutual contact. In the region of the tongue there is a leadthrough 46, preferably there are a plurality of leadthroughs 46. In particular, there are equal numbers of leadthroughs 46 as leadthroughs 45, preferably in each case for a common connecting mechanism.

For example, the second plug-in element 43 is connected at the attachment surface 57 to the structural component 38. An upper region 59 which, for example, adjoins the tongue 48 preferably has a leadthrough 60. Advantageously, a plurality of leadthroughs 60, in particular, identical leadthroughs 60, are provided for rivets and/or screws. No rivets and/or screws and/or other connecting mechanisms are illustrated in FIG. 4.

An advantageous sequence during the joining together of the two plug-in elements 42 and 43 is as follows:

The narrow- or end-side border surface of the tongue 48, the border surface corresponding to the rear guide surface 49, is guided by the guide surface 49, by bearing contact when placed thereon. By means of the two plug-on slopes 55, adaptation of the position, in particular, centering of the second plug-in element 43 with respect to the first plug-in element 42, takes place in the direction of the width with respect to the seat divider. The run-on slope 52 permits simple fitting of the tongue 48 with the contact surface 56a onto the contact surface 56.

FIG. 5 shows the connecting device 40 in the assembled state. For example, in the illustrated embodiment, the second plug-in element 43 is placed in the region of the contact surface 56a onto the first plug-in element 42 with the contact surfaces 56. In particular, the separating element 44 is arranged, preferably completely, in a manner inserted and/or countersunk between the two tongues 48. The dimensions of the two tongues 48 are selected in such a manner that the two tongues 48 can be fitted into the recesses on the first plug-in element 42. The tongues 48 preferably precisely or approximately precisely fill the recesses on the seat divider 37; in particular, tongues 48 are fitted into the recesses in such a manner that, from the front with respect to the sitting direction, an outer surface of the tongue 48 is flush with an outer surface of the seat divider 37.

The separating element 44 is advantageously designed in such a manner that its width is approximately 50% of the width of the seat divider. The guide surfaces 49 and 50 and the connecting surface 51 each have a width of approximately 25% of the width of the seat divider 37.

The tongue 48 is coordinated to the width of the guide surfaces or to the width of the recess on the seat divider 37. In particular, the width of the tongue 48 is approximately 25% of the width of the seat divider 37.

This advantageously results in the connecting device 40 corresponding in the arranged state to the width of the seat divider 37.

What has been stated also applies to the connecting device 40a. The connecting device 40 differs from the connecting device 40a only by the attachment surface 57 or 57a. The remaining features correspond.

LIST OF REFERENCE SIGNS

1 Row of seats
2 Sitting direction
3 Aircraft passenger seat
4 Aircraft passenger seat
5 Seat base
6 Backrest
7 Housing
8 Leg support
9 Seat base
10 Backrest
11 Housing
12 Leg support
13 Supporting leg
14 Supporting leg
15 Strut
16 End region
17 Installation point
18 Strut 19 End region
20 Installation point
21 Bracing element
22 Strut
23 End region
24 Installation point
25 Strut
26 End region
27 Installation point
28 Bracing element
29 Arm rest
30 Arm rest
31 Console
32 Multimedia Unit
33 Tray element
34 Storage compartment
35 Front cross rail
36 Rear cross rail
37 Seat divider
37a Seat divider
37b Seat divider
37c Seat divider
38 Structural component
38a Structural component
38b Structural component
38c Structural component
39 Belt attachment
40 Connecting device
40a Connecting device
40b Connecting device
40c Connecting device
41 Connecting structural component
41a Connecting structural component
42 First plug-in element
43 Second plug-in element
44 Separating element
45 Leadthrough
46 Leadthrough
47 Hole
48 Tongue
49 Guide surface
50 Guide surface
51 Connecting surface
52 Run-on slope
53 Curvature
54 Curvature
55 Plug-on slope
56 Contact surface
56a Contact surface
57 Attachment surface
57a Attachment surface
57b Attachment surface
57c Attachment surface
58 Material recess
59 Upper region
60 Leadthrough
61 Width
62 Depth
63 Height

The invention claimed is:

1. An aircraft passenger seat having a frame which is provided for fastening to a floor of an aircraft passenger cabin,
wherein the frame comprises a seat divider and cross rails running transversely with respect to the sitting direction,
wherein the seat divider is held by the cross rails,
wherein a housing is provided with a structural component,
wherein the housing of the aircraft seat at least partially surrounds a backrest of the aircraft seat,
wherein the housing is arranged fixedly on the seat divider,
wherein the backrest is adjustable relative to the housing in the region of the housing,
wherein the seat divider is connected to a structural component via a connecting device being designed as a plug-in connection,
wherein the connecting device comprises a first plug-in element and comprises a second plug-in element, the first plug-in element being arranged on the seat divider and the second plug-in element being arranged on the structural component, and
wherein the second plug-in element comprises two tongues, the tongues being arranged spaced apart from each other on the structural component.

2. The aircraft passenger seat as claimed in claim 1, wherein the connecting device is designed as a type of tongue-and-groove connection.

3. The aircraft passenger seat as claimed in claim 1, wherein the first plug-in element is arranged on the seat divider, the first plug-in element comprising a recess, and the recess having a depth of at least 50% of the depth of the seat divider, as seen in the sitting direction.

4. The aircraft passenger seat as claimed in claim 1, wherein the tongue has a length which is 50% to 150% of the depth of the recess on the first plug-in element.

5. The aircraft passenger seat as claimed in claim 1, wherein the first plug-in element comprises a guide surface.

6. The aircraft passenger seat as claimed in claim 1, wherein the first plug-in element comprises a plurality of guide surfaces, which are formed lying opposite one another.

7. The aircraft passenger seat as claimed in claim 1, wherein the first and second plug-in elements in the arranged state have approximately the same width as the seat dividers.

8. The aircraft passenger seat as claimed in claim 1, wherein the first plug-in element in the region of the recess has a width of 50% of the width of the seat divider.

9. The aircraft passenger seat as claimed in claim 1, wherein the first plug-in element comprises an upper and a lower end, the upper end comprising at least one beveled surface and the lower end being a surface protruding with respect to the surface of the recess.

10. The aircraft passenger seat as claimed in claim 1, wherein the second plug-in element has an attachment surface by which the second plug-in element is arranged on the structural component.

11. A row of seats having at least two aircraft passenger seats as claimed in claim 1.

* * * * *